(12) United States Patent
Kang et al.

(10) Patent No.: US 12,355,060 B2
(45) Date of Patent: Jul. 8, 2025

(54) ANODE FOR LITHIUM SECONDARY BATTERY AND LITHIUM SECONDARY BATTERY COMPRISING THE SAME

(71) Applicant: LG CHEM, LTD., Seoul (KR)

(72) Inventors: Da Young Kang, Daejeon (KR); Jieun Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 320 days.

(21) Appl. No.: 16/962,154

(22) PCT Filed: Sep. 5, 2019

(86) PCT No.: PCT/KR2019/011446
§ 371 (c)(1),
(2) Date: Jul. 14, 2020

(87) PCT Pub. No.: WO2020/060079
PCT Pub. Date: Mar. 26, 2020

(65) Prior Publication Data
US 2020/0411845 A1    Dec. 31, 2020

(30) Foreign Application Priority Data

Sep. 20, 2018  (KR) .......................... 10-2018-0112863

(51) Int. Cl.
*H01M 4/133*  (2010.01)
*H01M 4/02*  (2006.01)
(Continued)

(52) U.S. Cl.
CPC .......... *H01M 4/133* (2013.01); *H01M 4/366* (2013.01); *H01M 10/052* (2013.01); *H01M 2004/021* (2013.01); *H01M 2004/027* (2013.01)

(58) Field of Classification Search
CPC ................ H01M 4/133; H01M 4/366; H01M 2004/021; H01M 2004/027; H01M 10/052; H01M 50/46; C01B 2202/08
See application file for complete search history.

(56) References Cited

U.S. PATENT DOCUMENTS 10,497,930 B2 * 12/2019 Lee ...................... H01M 4/134
2008/0299460 A1   12/2008 Feng et al.
(Continued)

FOREIGN PATENT DOCUMENTS

CN    101315974 A    12/2008
CN    104716382 A    6/2015
(Continued)

OTHER PUBLICATIONS

Enlgish translation of Lee et al. (KR-20130067920-A). (Year: 2013).*

(Continued)

*Primary Examiner* — Jonathan G Leong
*Assistant Examiner* — Drew C Newman
(74) *Attorney, Agent, or Firm* — Birch, Stewart, Kolasch & Birch, LLP (57) ABSTRACT

A negative electrode for a lithium secondary battery including a lithium metal layer and a carbon-based layer on at least one surface of the lithium metal layer, the carbon-based layer including porous carbon materials aligned in one direction and oriented horizontally with reference to the lithium metal layer and a lithium secondary battery including the same.

2 Claims, 6 Drawing Sheets

(51) Int. Cl.
*H01M 4/36* (2006.01)
*H01M 10/052* (2010.01)

(56) References Cited

U.S. PATENT DOCUMENTS

| | | | |
|---|---|---|---|
| 2009/0272935 A1* | 11/2009 | Hata | B01J 20/20 |
| | | | 252/502 |
| 2010/0196695 A1* | 8/2010 | Garcia | C01B 32/16 |
| | | | 977/734 |
| 2011/0165466 A1* | 7/2011 | Zhamu | H01M 10/0562 |
| | | | 429/231.95 |
| 2013/0130118 A1 | 5/2013 | Ryu et al. | |
| 2013/0309571 A1 | 11/2013 | Yoon et al. | |
| 2015/0207143 A1* | 7/2015 | Wu | H01M 4/366 |
| | | | 429/231.8 |
| 2017/0373322 A1* | 12/2017 | Zhamu | H01M 4/366 |
| 2018/0358618 A1 | 12/2018 | Tour | |
| 2019/0058185 A1 | 2/2019 | Lee et al. | |
| 2019/0348668 A1* | 11/2019 | Kim | H01M 4/134 |
| 2020/0067075 A1 | 2/2020 | Choi et al. | |
| 2020/0127294 A1 | 4/2020 | Guo et al. | |
| 2020/0235385 A1 | 7/2020 | Kim | |

FOREIGN PATENT DOCUMENTS

| | | | | |
|---|---|---|---|---|
| CN | 106898778 A | | 6/2017 | |
| CN | 107743645 A | | 2/2018 | |
| EP | 3 509 138 A2 | | 7/2018 | |
| JP | 2007182352 A | * | 7/2007 | B01J 20/20 |
| JP | 2015-228337 A | | 12/2015 | |
| JP | 2018-513541 A | | 5/2018 | |
| KR | 10-2013-0056731 A | | 5/2013 | |
| KR | 10-2013-0067920 A | | 6/2013 | |
| KR | 10-2013-0009234 A | | 9/2013 | |
| KR | 10-2013-0128273 A | | 11/2013 | |
| KR | 10-2016-0046327 A | | 4/2016 | |
| KR | 10-2016-0099458 A | | 8/2016 | |
| KR | 20160099458 A | * | 8/2016 | H01M 4/133 |
| KR | 10-2018-0020599 A | | 2/2018 | |
| KR | 10-2018-0036564 A | | 4/2018 | |
| KR | 10-2018-0103725 A | | 9/2018 | |
| WO | WO 2018/034526 A1 | | 2/2018 | |
| WO | WO 2018/062844 A2 | | 4/2018 | |
| WO | WO 2018/164494 A1 | | 9/2018 | |

OTHER PUBLICATIONS

Zhang et al. "Magnetron sputtering amorphous carbon coatings on metallic lithium: Towards promising anodes for lithium secondary batteries" Journal of Power Sources 266 (2014) 43-50 (Year: 2014).*

English translation of Takashi et al. (JP-2015228337-A). (Year: 2015).*

International Search Report (PCT/ISA/210) issued in PCT/KR2019/011446, dated Dec. 12, 2019.

Extended European Search Report for European Application No. 19861355, dated Mar. 29, 2021.

Huang et al., "Manipulating surface reactions in lithium-sulphur batteries using hybrid anode structures," Nature Communications, vol. 5, No. 3015, Jan. 9, 2014, pp. 1-7.

* cited by examiner

ANODE FOR LITHIUM SECONDARY BATTERY AND LITHIUM SECONDARY BATTERY COMPRISING THE SAME

TECHNICAL FIELD

The present application claims the benefit of priority based on Korean Patent Application No. 10-2018-0112863 filed on Sep. 20, 2018, entire disclosure of which are incorporated herein by reference its entirety.

The present invention relates to a negative electrode for a lithium secondary battery and a lithium secondary battery comprising the same.

BACKGROUND ART

Recently, there is increasing interest in energy storage technology. As the application area thereof extends to the energy for mobile phones, camcorders, notebook PCs, and even electric vehicles, the effort of research and development of electrochemical devices is being carried out more and more concretely.

Electrochemical devices are the most noteworthy area in this respect, and among them, the development of a secondary battery capable of charging/discharging is the focus of attention. Recently, in developing these batteries, research and development on the design of new electrodes and batteries have been conducted in order to improve capacity density and energy efficiency.

Among the secondary batteries currently being applied, the lithium secondary batteries developed in the early 1990s are attracting much attention as there is an advantage in that it has much higher operating voltage and energy density than conventional batteries such as Ni-MH, Ni—Cd, and sulfuric acid-lead batteries using an electrolyte solution in the form of an aqueous solution.

In general, the lithium secondary battery has a structure, in which an electrode assembly including a positive electrode, a negative electrode, and a separator interposed between the positive electrode and the negative electrode is laminated or wound, and is constructed by placing the electrode assembly in a battery case and injecting non-aqueous electrolyte solution therein. As a negative electrode, a lithium electrode is used by attaching a lithium foil on a planar current collector.

In the case of lithium secondary battery, the formation and removal of lithium is irregular during charging/discharging, and thus lithium dendrites are formed, which leads to a continuous reduction in capacity. In order to solve this problem, studies on the introduction of a polymer protective layer or an inorganic solid protective layer into the lithium metal layer, the increase of salt concentration in electrolyte solution, or the application of appropriate additives have been conducted. However, the inhibitory effect of lithium dendrites in these studies is insufficient. Therefore, solving the problem by modifying the lithium metal negative electrode itself or modifying the battery structure may be an effective alternative.

PRIOR ART DOCUMENT

Patent Document

Korean Patent Publication No. 10-2013-0056731

DISCLOSURE

Technical Problem

As described above, the conventional lithium secondary battery has a problem that the stability and lifetime characteristics of the battery are reduced due to lithium dendrites generated on the electrode surface during charging/discharging. Accordingly, as a result of various studies, the inventors of the present invention have completed the present invention by confirming that when the carbon-based thin film layer in which the plurality of porous carbon materials are aligned in one horizontal direction is formed on the lithium metal layer, generation of lithium dendrites may be suppressed and lifetime characteristic may be improved.

Therefore, it is an object of the present invention to provide a negative electrode for a lithium secondary battery comprising a carbon-based thin film on a lithium metal layer and a lithium secondary battery comprising the same.

Technical Solution

In order to achieve the above object, the present invention provides a negative electrode for a lithium secondary battery comprising a lithium metal layer; and a carbon-based thin film layer formed on at least one surface of the lithium metal layer, wherein, in the carbon-based thin film layer, a plurality of porous carbon materials are aligned in one horizontal direction.

In addition, the present invention provides a lithium secondary battery comprising a positive electrode; a negative electrode; a separator interposed between the positive electrode and the negative electrode; and an electrolyte, wherein the negative electrode is the negative electrode of the present invention.

Advantageous Effects

In the negative electrode for a lithium secondary battery of the present invention, the carbon-based thin film layer formed on the lithium metal layer can suppress the formation of lithium dendrites and thus make the reactivity of the battery uniform and improve the lifetime characteristic.

BEST MODE

Hereinafter, the present invention will be described in more detail.

A major cause of premature degeneration of the lithium secondary battery may be the decrease in efficiency of the lithium negative electrode. If a lithium metal is used as a negative electrode, not only the reaction is not uniform due to the non-uniform oxide layer (native oxide layer), but also dead lithium is easily generated due to the growth of dendrites during charging (Li plating), and lithium which can participate in the reaction is consumed, thereby reducing the efficiency of the lithium-based negative electrode.

In order to secure uniform reactivity on the surface of lithium and to suppress the growth of lithium dendrites, methods of forming a protective film, a conductive host matrix, or the like on a lithium metal layer and the like have been attempted. In the case of the protective film, high mechanical strength for suppressing lithium dendrites and high ionic conductivity for delivering lithium ions are required at the same time, but the mechanical strength and ionic conductivity are in a trade-off relationship with each other, and thus it is difficult to simultaneously improve the mechanical strength and the ionic conductivity at the same time. In the case of the conductive host matrix, lithium needs to be Li-plated inside the host matrix to serve as a host, but lithium is accumulated only on the surface of the host matrix, thereby growing lithium dendrites.

Therefore, the present invention is to provide a negative electrode for a lithium secondary battery that can improve the lifetime characteristic of the battery by preventing the growth of lithium dendrites.

Negative Electrode for Lithium Secondary Battery

The present invention relates to a negative electrode for a lithium secondary battery comprising a lithium metal layer; and a carbon-based layer (e.g., thin film layer) on at least one surface of the lithium metal layer, said carbon-based layer comprising porous carbon materials aligned in one direction and oriented horizontally with reference to the lithium metal layer.

Figure 1:
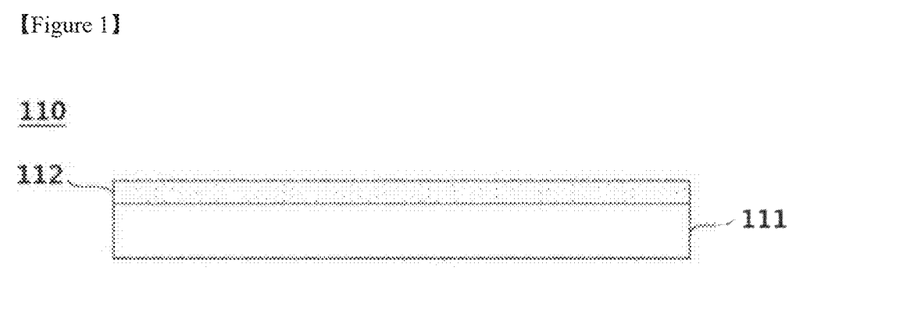
FIG. 1 is a structure showing an embodiment of a negative electrode for a lithium secondary battery of the present invention.

FIG. 1 is a cross-sectional view of a negative electrode for a lithium secondary battery according to an embodiment of the present invention.

Referring to FIG. 1, the negative electrode (110) for a lithium secondary battery has a structure in which a carbon-based thin film layer (112) is stacked on a lithium metal layer (111). In this figure, the carbon-based thin film layer (112) is formed only on one surface of the lithium metal layer (111), but may be formed on both surfaces.

The lithium metal layer (111) may be lithium metal or lithium alloy. In that case, the lithium alloy contains an element capable of alloying with lithium, and specifically the lithium alloy may be an alloy of lithium and at least one selected from the group consisting of Si, Sn, C, Pt, Ir, Ni, Cu, Ti, Na, K, Rb, Cs, Fr, Be, Mg, Ca, Sr, Sb, Pb, In, Zn, Ba, Ra, Ge, and Al.

The lithium metal layer (111) may be a sheet or a foil. In some cases, the lithium metal layer may have a form in which lithium metal or lithium alloy is deposited or coated by a dry process on the current collector, or a form in which metal and alloy in the form of a particle phase are deposited or coated by a wet process or the like.

At this time, the method of forming the lithium metal layer (111) is not particularly limited, and may be a lamination method, a sputtering method or the like, which is a known metal thin-film formation method. In addition, the lithium metal layer (111) of the present invention also includes a case where a metal lithium thin film is formed on a metal plate by initial charging after assembling a battery without a lithium thin film in a current collector.

The lithium metal layer (111) may be adjusted in width depending on the shape of the electrode to facilitate the manufacture of the electrode. The lithium metal layer (111) may have a thickness of 1 μm to 500 μm, preferably 10 μm to 350 μm, more specifically 50 μm to 200 μm.

In addition, the lithium metal layer (111) may further include a current collector on one side thereof. Specifically, the lithium metal layer (111) may be a negative electrode, and in this case, the current collector may be a negative electrode current collector.

The negative electrode current collector is not particularly limited as long as it has high electrical conductivity without causing chemical changes in the battery, and may be selected from the group consisting of copper, aluminum, stainless steel, zinc, titanium, silver, palladium, nickel, iron, chromium, and alloys and combinations thereof. The stainless steel can be surface-treated with carbon, nickel, titanium, or silver, and the alloy may be an aluminum-cadmium alloy. In addition to those, a nonconductive polymer, the surface of which is treated with sintered carbon, i.e. a conductive material, or a conductive polymer, etc. may be used. In general, thin copper foil is used as the negative electrode current collector.

In addition, the shape of the negative electrode current collector can be various forms such as a film having or not having fine irregularities on a surface, sheet, foil, net, porous body, foam, nonwoven fabric and the like.

In addition, the negative electrode current collector is in the thickness range of 3 μm to 500 μm. If the thickness of the negative electrode current collector is less than 3 μm, the current collecting effect is lowered. On the other hand, if the thickness exceeds 500 μm, when folding and then assembling the cell, there is a problem that the workability is reduced.

In general, when using lithium metal as a negative electrode, the following problems exist. First, when lithium is used as a negative electrode, a passivation layer is formed by reacting with electrolyte, water, impurities in the battery, lithium salt, etc., and this layer causes difference in local current density to form lithium dendrites. In addition, the dendrites thus formed may grow and cause direct internal short-circuit with the positive electrode beyond the pores of the separator, resulting in the explosion phenomenon of the battery. Second, lithium is a soft metal and its mechanical strength is weak, and thus lithium is very difficult to handle for use without additional surface treatment.

Therefore, in the present invention, by forming the carbon-based thin film layer (112) on the surface of the lithium metal layer (111), it is possible to reinforce the formation of the passivation layer and the mechanical strength, in particular to prevent the formation of dendrite effectively.

The carbon-based thin film layer (112) of the present invention is formed on the lithium metal layer (111) described above, and suppresses the formation of lithium dendrites by mitigating non-uniform deflection of electrons through the conductive surface of the carbon-based thin film layer during charging/discharging of the negative electrode (110). Through this, it is possible to ensure a more uniform reactivity of lithium. Therefore, an internal short circuit of the battery can be prevented, thereby improving cycle lifetime characteristic during charging/discharging.

When the carbon materials, which are absorbent materials for the lithium dendrites, come into contact with each other and aggregate, a conductive network is formed, and thus electrons are uniformly dispersed on the surface of the negative electrode through the conductive network. In this case, if the pores formed by the carbon-based thin film layer are uneven or largely formed to several tens of micrometers or more, the movement of lithium ions may not be prevented, and dendrites may be formed, resulting in deterioration of cycle characteristic of the battery. Therefore, the carbon material which is an absorbent material for the lithium dendrites is preferably distributed uniformly in one direction.

Therefore, the carbon-based thin film layer (112) of the present invention is characterized in that the plurality of porous carbon materials are aligned in one horizontal direction.

In the present invention, the horizontal direction refers to the horizontal direction with reference to the lithium metal layer (111).

The carbon-based thin film layer includes a plurality of carbon materials aligned in one direction and oriented horizontally with the lithium metal layer.

The plurality of carbon materials contained in the carbon-based thin film layer may be, for example, those bonded by a binder or those of a form formed and cured in a predetermined direction when the carbon material is spun by electrospinning.

In the above description, the horizontal direction should be interpreted to include a direction forming an angle of 0 to 45°, preferably 0 to 10° with the lithium metal layer, as well as the complete horizontal direction, in consideration of the manufacturing process of the carbon-based thin film layer.

Also, even in the case of alignment in one direction, it should be interpreted that some carbon materials having different directions may be contained, in consideration of the manufacturing process of the carbon-based thin film layer. That is, when the carbon material as a whole has a directivity in one direction, it is to be understood that the case where some carbon materials having different directions are contained is also in a one-direction alignment state.

The carbon-based layer may have a thickness of 1 μm to 20 μm, preferably 2 μm to 8 μm. If the thickness of the carbon-based layer is less than 1 μm, the internal pore structure of the carbon-based layer may be collapsed, and the internal pores may not be sufficient to inhibit the growth of lithium dendrites. If the thickness of the carbon-based layer exceeds 20 μm, the thickness of the negative electrode becomes thicker, the weight may be increased, and the energy density per volume and weight may be decreased.

The porous carbon material may include carbon nanotubes or carbon nanofibers, and preferably carbon nanotubes. The carbon nanotubes may be single-walled carbon nanotubes, double-walled carbon nanotubes, or multi-walled carbon nanotubes.

The diameter of the porous carbon material Is 10 nm to 1000 nm, preferably 20 nm to 50 nm. It is very difficult to produce the porous carbon material having the diameter of less than 10 nm. If the diameter of the porous carbon material exceeds 1000 nm, it cannot exhibit an inhibitory effect on the generation of the lithium dendrites.

In addition, as the plurality of porous carbon materials of the carbon-based layer are aligned in one horizontal direction, a predetermined space is formed between the porous carbon materials, which means pores are present in the carbon-based layer.

The pores of the carbon-based layer have a size of 1 nm to 200 nm, preferably 10 nm to 100 nm. When the porous carbon materials form a structure aligned in one horizontal direction, the pores of the carbon-based thin film layer may have a size of 1 nm to 200 nm, and the carbon-based thin film layer comprising porous carbon materials that are not unidirectionally aligned is difficult to generate pores in the above range, and generally generates non-uniform pores of several tens of micrometers or more. If the pore of the carbon-based layer exceeds 200 nm, it cannot exhibit the effect of inhibiting the growth of the lithium dendrites.

As the plurality of porous carbon materials form a narrow gap, i.e., the horizontal direction aligned with the pores, lithium ions are plated after passing through small pores between the porous carbon materials, and thus the surface of the lithium negative electrode may have a uniform shape even after charging/discharging the lithium secondary battery. Accordingly, the carbon-based thin film layer in which a plurality of porous carbon materials are aligned in one horizontal direction may serve as a protective layer of the lithium metal layer.

In the case of a carbon-based thin film layer in which carbon materials are aligned in one vertical direction, the manufacturing process is complicated because the carbon material must be grown on the substrate in a vertical direction by using seeds and an additional step of dispersing the negative electrode active material in the carbon-based thin film layer is required. In addition, since the substrate cannot be removed while maintaining the structure of the vertically aligned carbon-based thin film layer, it must be used with the substrate. In this case, the substrate may be a durable metal including nickel or cobalt or the like that can withstand the manufacturing process of the carbon material aligned in one vertical direction, i.e., a metal having a high specific gravity, but the lithium metal layer may not be used because it does not have excellent durability.

In addition, the carbon-based thin film layer is not manufactured to have a thin thickness due to the vertical direction, and generally manufactured to a thickness of several tens of micrometer or more, so that there is a problem that the thickness of the negative electrode is thickened, the weight is increased, and the energy density per volume and weight is lowered. In the case of the carbon-based thin film layer in which a plurality of porous carbon materials are aligned in one vertical direction, lithium is accumulated only on the surface of the carbon-based thin film layer as a host matrix, and the carbon-based thin film layer could not act as a protective layer formed on the lithium negative electrode to inhibit the growth of lithium dendrites.

In the present invention, a plurality of porous carbon materials having a diameter as described above is aligned in one horizontal direction to include a carbon-based thin film layer having pores as described above, thereby preventing the formation of lithium dendrites and thus improving lifetime characteristic of the battery as described above.

The negative electrode for the lithium secondary battery may be preferably a negative electrode for a lithium-sulfur battery.

The carbon-based thin film layer (112) according to the present invention may be formed by a method selected from the group consisting of sputtering, evaporation, chemical vapor deposition (CVD), physical vapor deposition (PVD), atomic layer deposition (ALD), arc discharge, and combinations thereof, and specifically, physical vapor deposition is applied.

Forming the carbon-based thin film layer (112) by the physical vapor deposition is preferable because it can form a uniform and thin carbon-based thin film layer.

In addition, the physical vapor deposition is performed for 20 minutes to 120 minutes, preferably 40 minutes to 120 minutes, more preferably 40 minutes to 100 minutes, and most preferably 40 minutes to 60 minutes. If the deposition time is less than 20 minutes, the thickness of the carbon-based thin film layer is so thin that it does not function as a protective film and cracks occur. On the other hand, if the deposition time exceeds 120 minutes, the carbon-based thin film layer becomes thicker, which causes a problem of lowering the energy density.

After the deposition step, a heat treatment process may be selectively performed as necessary. At this time, the heat treatment temperature may be 1200° C. Specifically, the heat treatment process is preferably performed by rapid thermal anneal having a temperature increase rate of 5° C./min to 300° C./min to the heat treatment temperature. This heat treatment process may induce uniform alignment of pores through self-assembly of the deposited carbon particles.

Lithium Secondary Battery

In addition, the present invention relates to a lithium secondary battery comprising a positive electrode; a negative electrode; a separator interposed between the positive electrode and the negative electrode; and an electrolyte, wherein the negative electrode may be a negative electrode of the present invention described above.

The positive electrode according to the present invention may be manufactured in the form of a positive electrode by coating a composition comprising a positive electrode active material, a conductive material, and a binder on the positive electrode current collector.

The positive electrode active material may vary depending on the use of the lithium secondary battery, and a known material is used with regard to the specific composition. For example, the positive electrode active material may be any one lithium transition metal oxide selected from the group consisting of lithium cobalt based oxide, lithium manganese based oxide, lithium copper based oxide, lithium nickel based oxide and lithium manganese composite oxide, and lithium-nickel-manganese-cobalt based oxide, and more particularly may be, but is not limited to, $Li_{1+x}Mn_{2-x}O_4$ (wherein x is 0 to 0.33), lithium manganese oxides such as $LiMnO_3$, $LiMn_2O_3$, $LiMnO_2$; lithium copper oxide ($Li_2CuO_2$); vanadium oxides such as $LiV_3O_8$, $V_2O_5$, $Cu_2V_2O_7$; lithium nickel oxides represented by $LiNi_{1-x}M_xO_2$ (wherein M=Co, Mn, Al, Cu, Fe, Mg, B, or Ga, and x=0.01 to 0.3); lithium manganese composite oxide represented by $LiMn_{2-x}MO_2$ (wherein M=Co, Ni, Fe, Cr, Zn, or Ta, and x=0.01 to 0.1) or $Li_2Mn_3MO_8$ (wherein M=Fe, Co, Ni, Cu, or Zn), lithium-nickel-manganese-cobalt based oxide represented by $Li(Ni_a Co_b Mn_c) O_2$ (wherein $0<a<1$, $0<b<1$, $0<c<1$, $a+b+c=1$), $Fe_2(MoO_4)$; sulfur element, disulfide compound, organosulfur compound, and carbon-sulfur polymer $((C_2S_x)_n: x=2.5$ to $50, n≥2)$; graphite-based materials; carbon black-based materials such as Super-P, Denka black, acetylene black, Ketjen black, channel black, furnace black, lamp black, thermal black, and carbon black; carbon derivatives such as fullerene; electrically conductive fibers such as carbon fiber or metal fiber; carbon fluoride; metal powders such as aluminum powder and nickel powder; and electrically conductive polymers such as polyaniline, polythiophene, polyacetylene, and polypyrrole; forms produced by carrying catalysts such as Pt or Ru to the porous carbon support, and preferably carbon-sulfur polymer may be used.

Therefore, the lithium secondary battery of the present invention may be preferably a lithium-sulfur battery.

The conductive material is used to further improve the electrical conductivity of the positive electrode active material. As a non-limiting example, graphite such as natural graphite or artificial graphite; carbon blacks such as carbon black, acetylene black, Ketjen black, channel black, furnace black, lamp black, and thermal black; conductive fibers such as carbon fiber and metal fiber; carbon fluoride; metal powders such as aluminum powder and nickel powder; conductive whiskers such as zinc oxide and potassium titanate; conductive metal oxides such as titanium oxide; polyphenylene derivative and the like can be used.

The positive electrode may further comprise a binder for binding the positive electrode active material and the conductive material and for binding to the current collector. The binder may comprise a thermoplastic resin or a thermosetting resin. For example, polyethylene, polypropylene, polytetrafluoroethylene (PTFE), polyvinylidene fluoride (PVDF), styrene-butadiene rubber, tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethyl vinyl ether-tetrafluoroethylene copolymer, and ethylene-acrylic acid copolymer and the like can be used alone or in a combination thereof, but are not limited thereto, and any binders that can be used in the art are all possible.

The positive electrode current collector Is as described above in relation to the negative electrode current collector, and in general, a thin plate of aluminum may be used for the positive electrode current collector.

The positive electrode as described above can be prepared by a conventional method. Specifically, the positive electrode can be prepared by applying a composition for forming the layer of the positive electrode active material onto the current collector, drying it, and optionally compressing and molding it into a current collector to improve electrode density, wherein the composition is prepared by mixing the positive electrode active material, the conductive material, and the binder in an organic solvent or water. At this time, as the organic solvent, it is preferable to use a solvent which can uniformly disperse a positive electrode active material, a binder, and a conductive material, and which is easily evaporated. Specifically, acetonitrile, methanol, ethanol, tetrahydrofuran, isopropyl alcohol and the like can be used as the organic solvent.

The composition for forming the layer of the positive electrode active material can be coated on a positive electrode current collector using conventional methods known in the art, and for example, various methods such as dipping method, spraying method, roll court method, gravure printing method, bar court method, die coating method, comma coating method, or a combination thereof can be used.

After such a coating process, evaporation of the solvent or the dispersion medium, densification of the coating film, and adhesion between the coating film and the current collector take place in the positive electrode and composition for forming the layer of the positive electrode active material through drying process. At this time, the drying is carried out according to a conventional method and is not particularly limited.

A conventional separator may be interposed between the positive electrode and the negative electrode. The separator is a physical separator having a function of physically separating the electrodes, and can be used without particular limitation as long as it is used as a conventional separator, and particularly, a separator with low resistance to ion migration in the electrolyte solution and excellent impregnating ability for the electrolyte solution is preferable.

In addition, the separator enables the transport of lithium ions between the positive electrode and the negative electrode while separating or insulating the positive electrode and the negative electrode from each other. The separator may be made of a porous, nonconductive, or insulating material. The separator may be an independent member such as a film or a coating layer added to the positive electrode and/or the negative electrode.

Examples of the polyolefin-based porous film which can be used as the separator may be films formed of any polymer alone selected from polyethylenes such as high density polyethylene, linear low density polyethylene, low density polyethylene, and ultra-high molecular weight polyethylene, and polyolefin-based polymers such as polypropylene, polybutylene, and polypentene, or formed of a polymer mixture thereof.

Examples of the nonwoven fabric that can be used as the separator is a nonwoven fabric formed by a polymer of polyphenyleneoxide, polyimide, polyamide, polycarbonate, polyethyleneterephthalate, polyethylenenaphthalate, polybutyleneterephthalate, olyetheretherketones, polyacetal, olyetheretherket, olyetheretherketones, polyester and the like alone or a mixture thereof. Such nonwoven fabrics include a nonwoven fabric in the form of a fiber to form a porous web, that is, a spunbond or a meltblown nonwoven fabric composed of long fibers.

The thickness of the separator Is not particularly limited, but is preferably in the range of 1 µm to 100 µm, more preferably 5 µm to 50 µm. If the thickness of the separator is less than 1 µm, the mechanical properties cannot be maintained. If the thickness of the separator exceeds 100 µm, the separator acts as a resistive layer, thereby deteriorating the performance of the battery.

The pore size and porosity of the separator are not particularly limited, but it is preferable that the pore size is 0.1 µm to 50 µm and the porosity is 10% to 95%. If the separator has a pore size of less than 0.1 µm or a porosity of less than 10%, the separator acts as a resistive layer. If the separator has a pore size of more than 50 µm or a porosity of more than 95%, mechanical properties cannot be maintained.

The electrolyte solution of the lithium secondary battery may be an aqueous or non-aqueous electrolyte solution as a lithium salt-containing electrolyte solution, specifically a non-aqueous electrolyte solution consisting of an organic solvent electrolyte solution and a lithium salt. In addition, an organic solid electrolyte or an inorganic solid electrolyte may be comprised, but is not limited thereto.

As the lithium salt, lithium salts conventionally used in the electrolyte solution for the lithium secondary battery may be used without limitation. The anions of the lithium salts may comprise, for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_2SO_3^-$, $CF_3CF_2SO^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO)_2N^-$, or a combination of two or more thereof.

As the organic solvent contained in the non-aqueous electrolyte solution, the organic solvents commonly used in the electrolyte solution for the lithium secondary battery may be used without limitation, and for example, ethers, esters, amides, linear carbonates, cyclic carbonates, etc. may be used alone or in combination of two or more thereof. Among them, carbonate compounds which are representatively cyclic carbonates, linear carbonates, or a mixture thereof may be comprised.

Specific examples of the cyclic carbonate compound may be at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a mixture of two or more thereof. Examples of such halides are, but are not limited to, fluoroethylene carbonate (FEC) and the like.

In addition, specific examples of the linear carbonate compound may comprise, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof.

In particular, ethylene carbonate and propylene carbonate, which are cyclic carbonates among the carbonate-based organic solvent, are highly viscous organic solvents having a high dielectric constant, so that the lithium salt in the electrolyte can be more easily dissociated. If such cyclic carbonates are mixed with linear carbonates having a low viscosity and a low dielectric constant, such as dimethyl carbonate and diethyl carbonate, in an appropriate ratio, an electrolyte solution having a higher electrical conductivity can be produced.

In addition, the ether among the organic solvents may be, but is not limited to, at least one selected from the group consisting of dimethyl ether, diethyl ether, dipropyl ether, methylethyl ether, methylpropyl ether, and ethylpropyl ether, or a mixture of two or more thereof.

Examples of the ester of the organic solvent may comprise, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, or a mixture of two or more thereof.

The injection of the non-aqueous electrolyte solution can be performed at an appropriate stage of the manufacturing process of the electrochemical device depending on the manufacturing process and required properties of the final product. That is, it can be applied before assembling the electrochemical device or in the final stage of assembling the electrochemical device.

In the case of the lithium secondary battery according to the present invention, it is possible to perform laminating or stacking and folding processes of the separator and the electrode, in addition to the winding process which is a general process. In addition, the case of the battery may be cylindrical type, square type, pouch type, coin type or the like.

In this case, the lithium secondary battery can be classified into various types of batteries such as lithium-sulfur battery, lithium-air battery, lithium-oxide battery, and lithium all-solid-state battery depending on the type of positive electrode materials and separator used, can be classified into cylindrical type, rectangular type, coin-shaped type, pouch type and the like depending on the type, and can be divided into bulk type and thin film type depending on the size. The structure and preparing method of these batteries are well known in the art, and thus detailed description thereof is omitted.

Hereinafter, preferred examples of the present invention will be described in order to facilitate understanding of the present invention. It will be apparent to those skilled in the art, however, that the following examples are illustrative of the present invention and that various changes and modifications can be made within the scope and spirit of the present invention, and also it is natural that such variations and modifications are within the scope of the appended claims.

MANUFACTURE OF LITHIUM-SULFUR BATTERY

Example 1

Figure 2:
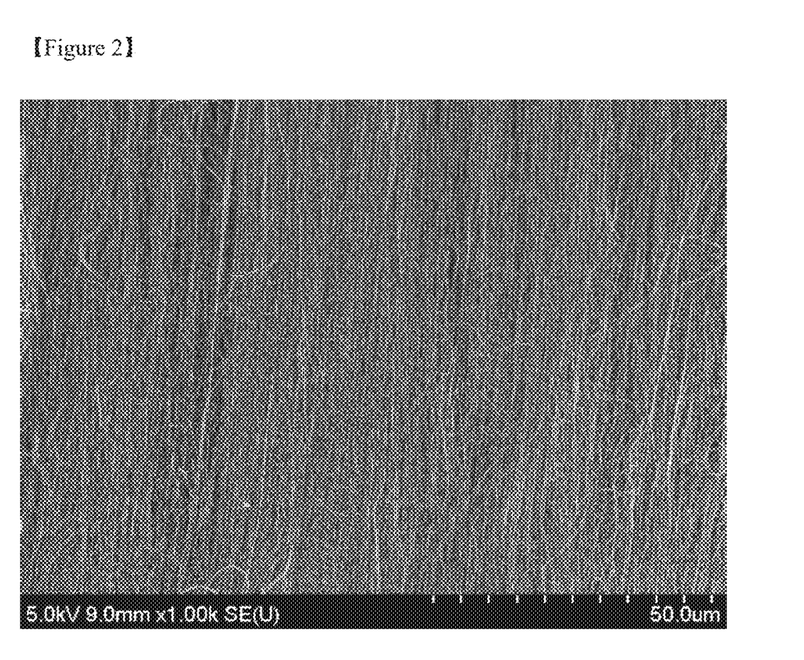
FIG. 2 is a SEM photograph observed for the carbon-based thin film layer of the negative electrode prepared in Example 1.

A negative electrode was prepared by aligning a plurality of carbon nanotubes having a diameter of 30 nm or less in one direction and then forming a carbon-based thin film, which forms pores having a size of 20 nm to 100 nm between the carbon nanotubes, on a lithium metal plate having a thickness of 40 μm. At this time, the thickness of the carbon-based thin film layer was 3 μm to 8 μm, the carbon nanotubes constituting the carbon-based thin film layer has a structure oriented in one horizontal direction with respect to the lithium metal plate. FIG. 2 shows a SEM image of the carbon-based thin film layer.

Sulfur-carbon composites were prepared through a ball mill process by mixing conductive carbon having a battery conductivity and sulfur in a weight ratio of 30:70. The sulfur-carbon composite was used as a positive electrode active material.

A positive electrode active material slurry was prepared by mixing 70 g of the sulfur-carbon composite, 20 g fluoride as a binder, and 500 g of N-methyl-2-pyrrolidone as a solvent. The positive electrode active material slurry was coated on an aluminum current collector to prepare a positive electrode.

A lithium-sulfur battery was prepared using a mixed solution of dimethoxyethane:dioxolane (1:1 by volume) as an electrolyte solution, in which 1 M of LiN(CF$_3$SO$_2$)$_2$ was dissolved, after interposing the polyolefin separator between the positive electrode and the negative electrode.

Comparative Example 1

Figure 3:
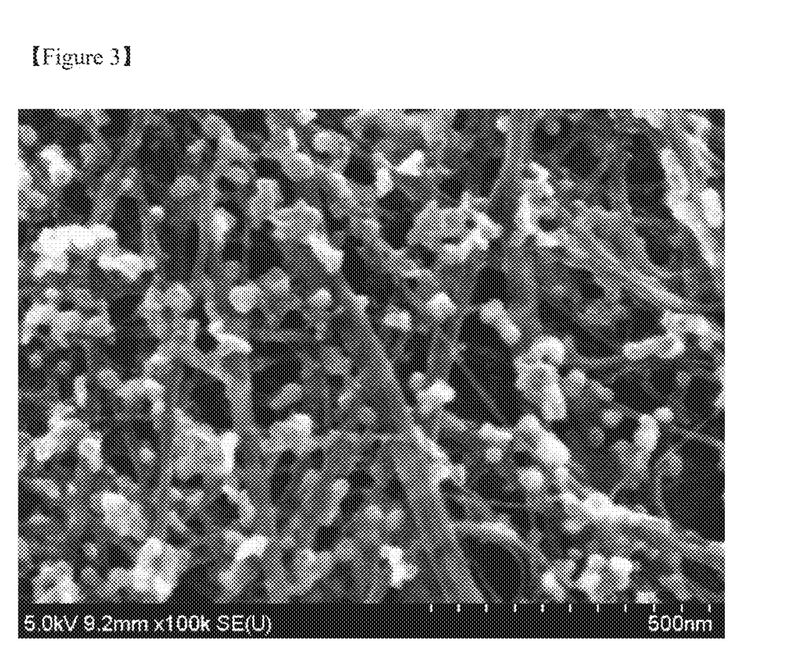
FIG. 3 is a SEM photograph observed for the carbon-based thin film layer of the negative electrode prepared in Comparative Example 1.

A negative electrode was prepared by forming a carbon-based thin film layer (thickness: 18 μm) on a 40 μm thick lithium metal plate by physical vapor deposition (PVD) using a carbon nanotube aggregate in which a plurality of carbon nanotubes has a diameter of 60 nm or less has a radial structure. At this time, the carbon-based thin film layer contains pores of 200 nm to 500 nm size, and the pores are formed by the space between the carbon nanotubes. FIG. 3 shows a SEM image of the carbon-based thin film layer.

Thereafter, a lithium-sulfur battery was prepared in the same manner as in Example 1 above.

Comparative Example 2

Figure 4:
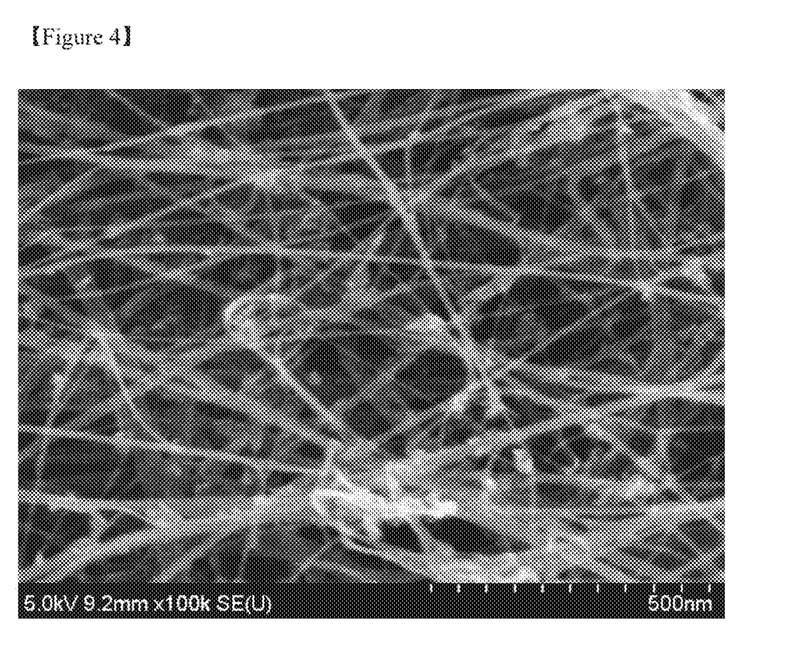
FIG. 4 is a SEM photograph observed for the carbon-based thin film layer of the negative electrode prepared in Comparative Example 2.

A negative electrode was prepared by forming a carbon-based thin film layer (thickness: 30 μm) on a 40 μm thick lithium metal plate by physical vapor deposition (PVD) using a carbon nanotube aggregate in which a plurality of carbon nanotubes has a diameter of 50 nm or less has a radial structure. At this time, the carbon-based thin film layer contains pores of 200 nm to 500 nm size, and the pores are formed by the space between the carbon nanotubes. FIG. 4 shows a SEM image of the carbon-based thin film layer.

Thereafter, a lithium-sulfur battery was prepared in the same manner as in Example 1 above.

Comparative Example 3

Figure 5:
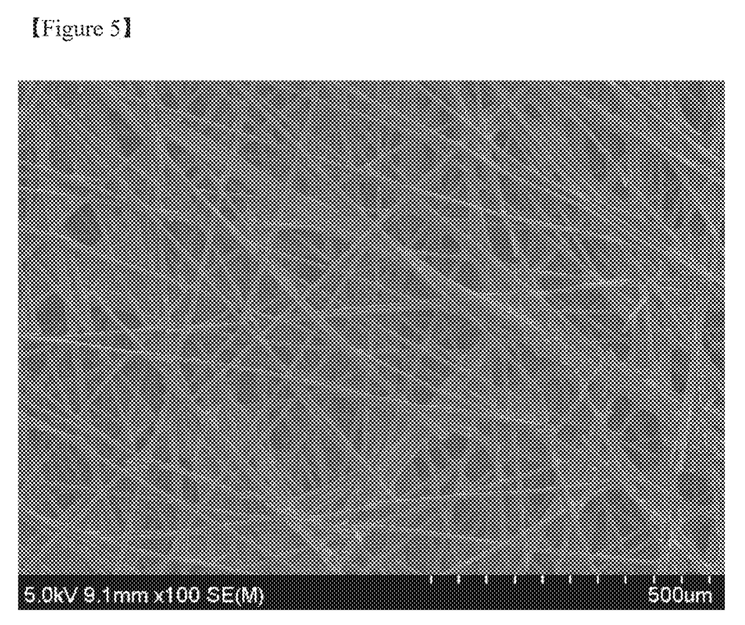
FIG. 5 is a SEM photograph observed for the carbon-based thin film layer of the negative electrode prepared in Comparative Example 3.

A negative electrode was prepared by forming a carbon-based thin film layer (thickness: 100 μm) on a 40 μm thick lithium metal plate by physical vapor deposition (PVD) using a carbon nanotube aggregate in which a plurality of carbon nanotubes has a diameter of 10 μm or less has a radial structure. At this time, the carbon-based thin film layer contains pores of 30 nm to 100 nm size, and the pores are formed by the space between the carbon nanotubes. FIG. 5 shows a SEM image of the carbon-based thin film layer.

Thereafter, a lithium-sulfur battery was prepared in the same manner as in Example 1 above.

Comparative Example 4

A 40 μm thick lithium metal plate was used as the negative electrode.

Thereafter, a lithium-sulfur battery was prepared in the same manner as in Example 1 above.

Experimental Example 1: Observation of Surface of Negative Electrode for Lithium Secondary Battery After manufacturing the lithium secondary batteries comprising the negative electrodes prepared in Example 1 and Comparative Examples 1 to 4, 40 times of charging/discharging was performed under the condition of 0.5 mA. Subsequently, in order to confirm whether or not the lithium dendrites are formed, the negative electrode was removed from the battery and its surface was observed.

Figure 7:
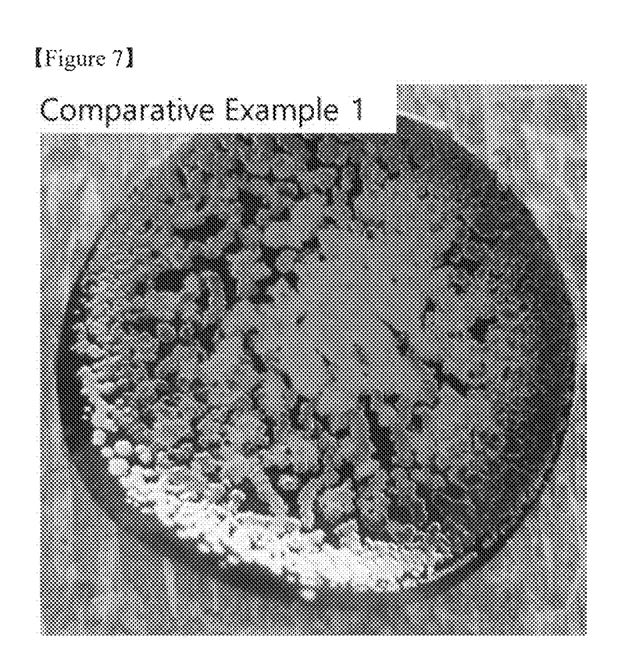
FIG. 7 is a photograph observed for the surface of the negative electrode prepared in Comparative Example 1 after 1 cycle.
Figure 8:
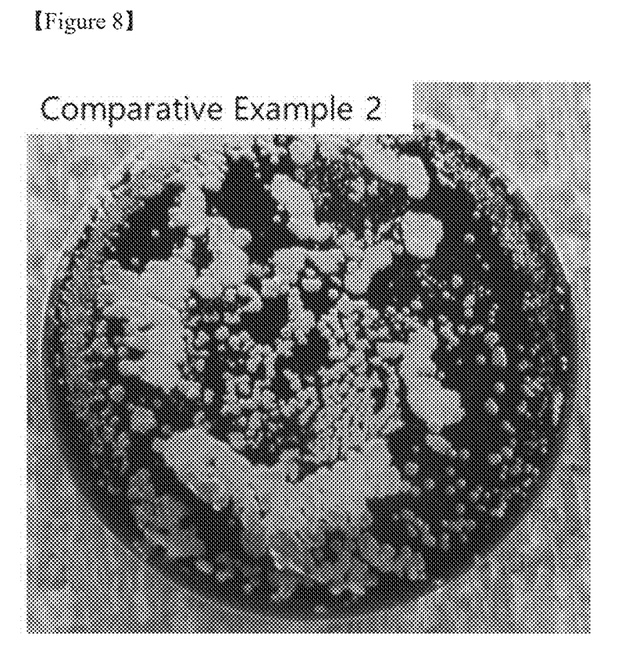
FIG. 8 is a photograph observed for the surface of the negative electrode prepared in Comparative Example 2 after 1 cycle.
Figure 9:
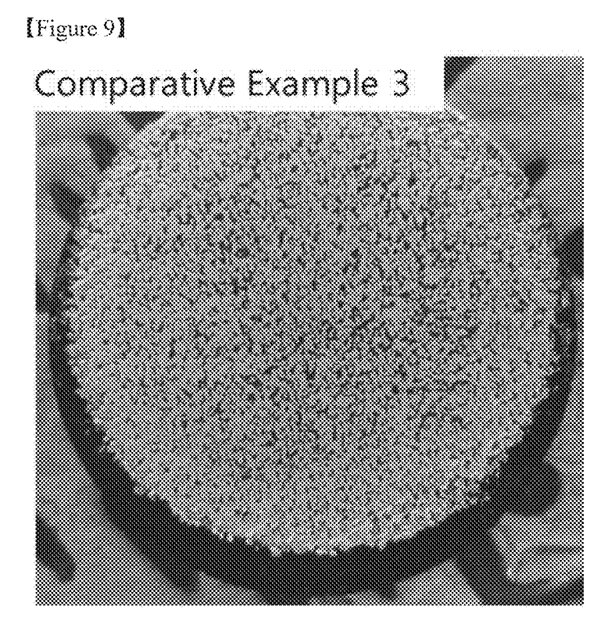
FIG. 9 is a photograph observed for the surface of the negative electrode prepared in Comparative Example 3 after 1 cycle.

The negative electrodes of Comparative Examples 1 to 3 showed a shape in which lithium was grown on the carbon-based thin film layer after one cycle (FIGS. 7 to 9).

Figure 6:
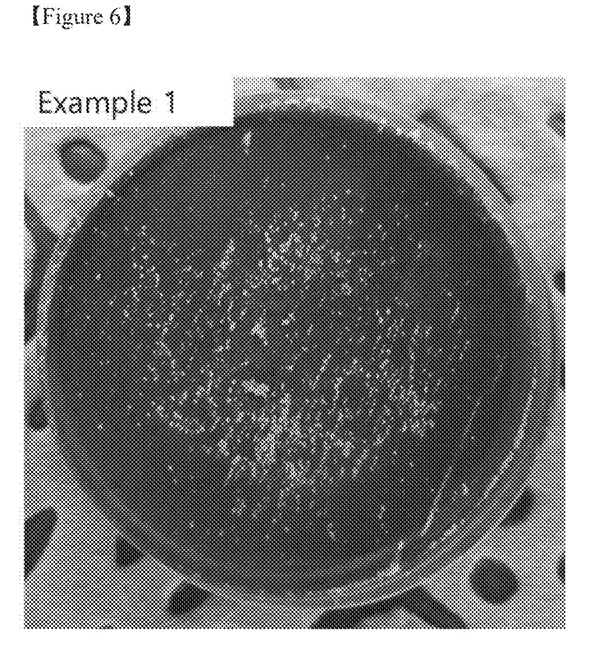
FIG. 6 is a photograph observed for the surface of the negative electrode prepared in Example 1 after 40 cycles.
Figure 10:
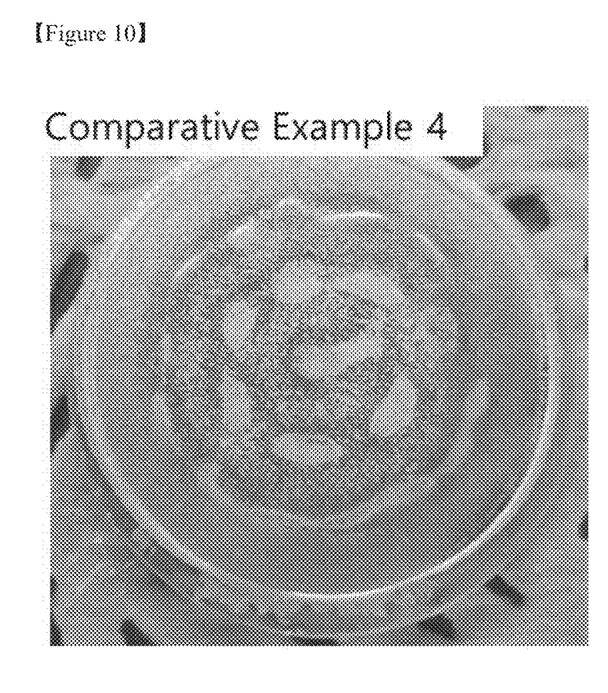
FIG. 10 is a photograph observed for the surface of the negative electrode prepared in Comparative Example 4 after 40 cycles.
Figure 11:
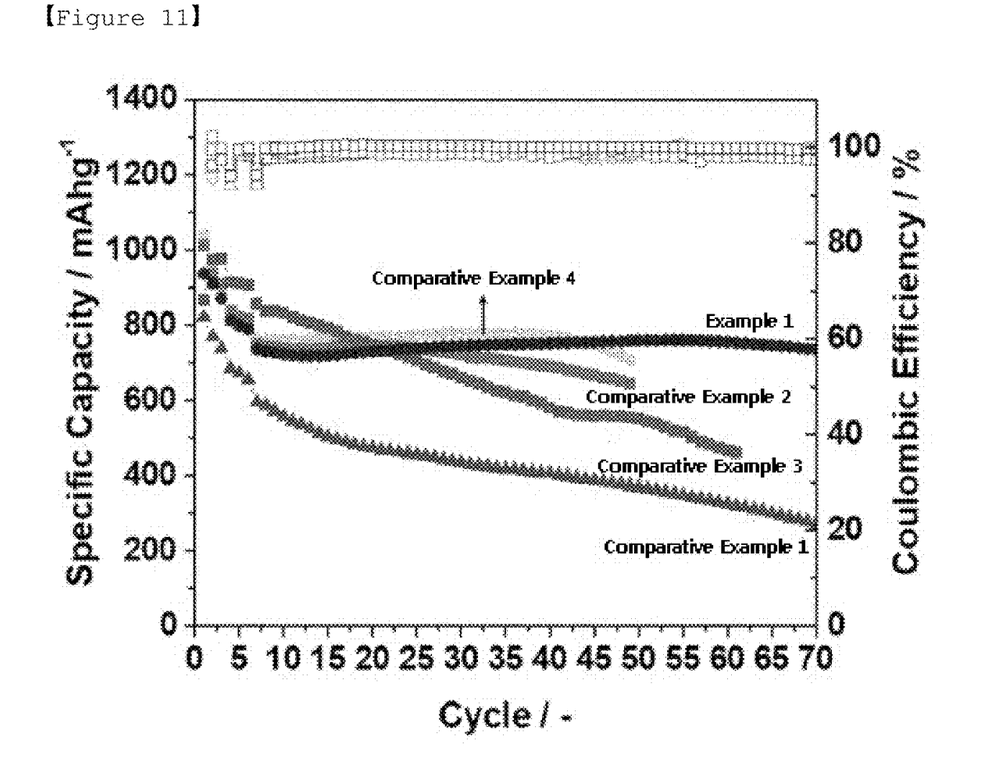
FIG. 11 is a measurement graph of lifetime characteristic of the lithium-sulfur battery of Experimental Example 2.

In contrast, the negative electrode of Example 1 was observed to have a very small area of lithium grown on the carbon-based thin film layer after 40 cycles (FIG. 6). In addition, the surface showed superiorly even shape, as compared with the surface after 40 cycles of the negative electrode of Comparative Example 4 prepared using lithium metal as a negative electrode (FIG. 10).

Therefore, it was confirmed that the negative electrode for a lithium secondary battery comprising a carbon-based thin film layer in which a plurality of porous carbon materials are aligned in one horizontal direction effectively controls the formation of lithium dendrites.

Experimental Example 2: Measurement of Lifetime Characteristic of Lithium Secondary Battery The lifetime characteristics of the lithium secondary batteries prepared in Example 1 and Comparative Examples 1 to 4 were measured.

The lifetime characteristics were measured at a charging voltage of 2.5V cut and a rate of 0.5 C, and at a discharging voltage of 1.8V cut and a rate of 0.5 C.

As a result, Example 1 showed the most excellent lifetime characteristic.

On the other hand, Comparative Examples 1 to 4 showed poor lifetime characteristics as compared to Example 1.

That is, it was confirmed that the lithium secondary battery comprising the carbon-based thin film layer in which the plurality of porous carbon materials was aligned in one horizontal direction was able to prevent the growth of lithium dendrites and thus showed excellent lifetime characteristics.

The carbon-based thin film layers of Comparative Examples 1 to 3 comprise a carbon nanotube aggregate in which a plurality of carbon nanotubes has a radial structure. Therefore, Comparative Examples 1 to 3 did not show the effect of improving the lifetime characteristics of the lithium secondary battery.

From the above experiments, it can be seen that the negative electrode comprising the carbon-based thin film layer in which a plurality of porous carbon materials are aligned in one horizontal direction may prevent the growth of lithium dendrites of the lithium secondary battery, thereby improving the lifetime characteristic of the lithium secondary battery.

DESCRIPTION OF SYMBOLS

110: Negative electrode for lithium secondary battery
111: Lithium metal layer
112: Carbon-based thin film layer

The invention claimed is:

1. A lithium secondary battery comprising:
    a positive electrode;
    a negative electrode;
    a separator interposed between the positive electrode and the negative electrode; and
    an electrolyte,
    wherein the negative electrode comprises:
        a lithium metal layer; and
        a carbon-based layer on at least one surface of the lithium metal layer, the carbon-based layer comprising a porous carbon material structure comprising carbon nanotubes and pores between the carbon nanotubes,
    wherein the carbon nanotubes are oriented axially, the axial orientations of the carbon nanotubes being aligned in a horizontal direction with reference to the lithium metal layer,
    wherein the horizontal direction is a direction forming an angle of 0° to 10° with reference to the lithium metal layer,
    wherein the pores of the porous carbon material structure are defined by elongated gaps formed between elongated surfaces of respective axially oriented carbon nanotubes,
    wherein the pores of the porous carbon material structure have a pore diameter ranging from 20 nm to 100 nm,
    wherein the lithium metal layer has a thickness of 40 μm to 50 μm,
    wherein the carbon nanotubes have a diameter of 10 nm to 30 nm, and
    wherein the carbon-based layer has a thickness of 3 μm to 8 μm.

2. The lithium secondary battery of claim 1, wherein the lithium secondary battery is a lithium-sulfur battery.

* * * * *